United States Patent Office 3,589,944
Patented June 29, 1971

3,589,944
FUEL CELLS AND THEIR METHOD OF OPERATION
Douchan Stanimirovitch, 68 Rue Lecourbe, Paris XV, France; Jean François Laurent, 12 Rue Victor Hugo, 86 Poitiers, France; and Patrice Robert Jean Verrez, deceased, late of La Roche-sur-Yon, France, by Denise Lucie Henriette Verrez, 28 Rue Anatole France, 85 La Roche-sur-Yon, France.
Continuation of application Ser. No. 599,789, Dec. 7, 1966, which is a continuation-in-part of application Ser. No. 62,148, Oct. 12, 1960. This application June 10, 1969, Ser. No. 847,769
Claims priority, application France, Oct. 16, 1959, 807,755, Patent 1,363,851; May 16, 1960, 827,419 (addition 83,404); June 18, 1960, 830,590 (addition 86,001)
Int. Cl. H01m 27/00, 27/02
U.S. Cl. 136—86R                                                  13 Claims

ABSTRACT OF THE DISCLOSURE

A fuel cell adapted for operation with a reducing gas and an oxidizing gas and a circulating liquid aqueous electrolyte constructed of porous gas-diffusion positive and negative electrodes with the major, generally planar, surfaces of the electrodes of opposing polarity in contact with such electrolyte and spaced apart at a distance less than the maximum thickness of the ionic diffusion layer of such electrolyte, e.g., about 0.05 to about 0.5 mm., with the oxidizing and reducing gases being supplied to their respective electrodes at the surface thereof opposite such major surface. Such a fuel cell is operable at a temperature in the range of from ambient to about 70° C. and at gas overpressures less than about 1 kilogram per square centimeter and insufficiently greater than the pressure on the electrolyte to cause the gases to pass entirely through the electrodes with substantially reduced polarization than if the spacing between the electrodes' major surfaces was greater than stated.

---

This invention relates to fuel cells and methods of operating them at low temperatures and low pressures. The fuel cell has porous gas diffusion electrodes through which diffuse gaseous fuel and gaseous oxidant to the electrochemically reactive surfaces of the electrodes. A liquid aqueous electrolyte is circulated between the electrodes, the facing surfaces of which are spaced apart at a distance less than the maximum thickness of the ionic diffusion layer of said electrolyte, i.e., at a distance between about 0.05 and about 0.5 millimeter. Such fuel cells are operable at less than about 70° C. and at gas overpressures of less than about 1 kilogram per square centimeter with substantially less concentration polarization than results at electrode spacings in excess of 0.5 millimeter, and produce more current at a given voltage than is predictable based upon current and voltage measurements of a fuel cell constructed and operated otherwise the same except that the electrodes are spaced at distances greater than 0.5 millimeter.

This application is a continuation of application Ser. No. 599,789, filed Dec. 7, 1966 now abandoned which is a continuation-in-part of application Ser. No. 62,148, filed Oct. 12, 1960 now abandoned, which application is based upon and claims the benefit of the filing dates of French patent applications Ser. No. 807,755, filed Oct. 16, 1959, now Pat. No. 1,363,851, No. 827,479, filed May 16, 1960 now addition Pat. No. 83,404 and No. 830,590, filed June 18, 1960.

It is customary to define the principle of fuel cells, particularly those using hydrogen and oxygen, by considering that they are based upon the phenomenon which is the reverse of electrolysis, i.e., instead of causing water to be decomposed by an electric current, electric power is generated by ionizing gases and combining them to form water. Such a phenomenon was discovered at least by 1829 by Grove who developed the first gas fuel cell. Although hydrogen and oxygen are the gases most frequently used in powering a fuel cell, other useful gases are known, such as carbon monoxide, methane or other hydrocarbons as reducing gases, and halogens as oxidizing gases.

As a source of electrical power a fuel cell has substantial potential because of its relatively high theoretical efficiency as measured by the percentage of potential energy (in chemical form) which may be converted to electrical power. However, many problems of a technical nature have hindered the development of commercially useful fuel cells. The abundance of prior art manifests the substantial amount of effort which has been devoted in the past towards overcoming such problems. A basic problem is the fact that during the operation of a fuel cell, the reducing and oxidizing gases must be converted to ionic form using electrodes having electrochemically catalytic characteristics. The conversion is difficult, and it is desirable to have electrodes which will catalyze the necessary ionization at a high reaction rate.

A second major problem, and the one to which this invention is directed, is the fact that the electrodes of the fuel cell become polarized, thus decreasing the fuel cell's electrical power production.

An operating fuel cell on closed circuit produces a voltage (an electromotive force) somewhat less than its theoretically obtainable voltage, all other conditions being the same. The difference between the actual voltage developed and the theoretically obtainable voltage, i.e., the internal voltage loss, results largely from internal ohmic resistance and polarization of the electrodes. The internal ohmic resistance of the cell is a function primarily of the character and thickness of the various components of the cell disposed between the surfaces of the electrodes at or near which the electrochemical reactions occur. For cells of the type here involved, the ohmic resistance depends upon the character of the electrolyte and the distance through the electrolyte between the opposed surfaces of the electrodes of opposite polarity. Using an electrolyte comprising an aqueous solution of potassium hydroxide or sodium hydroxide, the resistivity reaches a minimum at approximately a 5 N concentration and then increases rapidly as the hydroxide concentration is reduced upon dilution with water. Since operation of a hydrogen-oxygen fuel cell inherently produces about 0.33 milliliter of water per ampere-hour, it is necessary to provide for circulation of the electrolyte and removal therefrom of the water so produced in order to prevent dilution of the electrolyte. Because the ohmic resistance of an electrolyte of specific concentration is a linear function of the distance through the electrolyte between the opposed electrodes, such distance has naturally been reduced, and at an electrode spacing of about 1–2 millimeters, the ohmic resistance on account of the electrolyte, assuming an electrolyte concentration providing the minimum resistivity, becomes relatively insignificant. As pointed out by K. V. Kordesch at page 366 in his chapter on "Low Temperature Hydrogen-Oxygen Fuel Cells" in the monograph "Fuel Cells" edited by Will Mitchell, Jr. (Academic Press, 1963), electrode spacings less than 1 millimeter are impractical in view of the necessity to maintain sufficient circulation of the electrolyte to remove heat and to prevent the electrolyte from becoming diluted with the water formed during the operation of the cell and hence decreasing the concentration of the hydroxide, thereby increasing the resistivity of the electrolyte. The very slight decrease in internal ohmic resistance obtainable by reducing the electrode spacing to less than 1 mm. did not justify incurring the extra difficulty in cell construction and electrolyte circulation which was inherent in closer electrode spacings.

Polarization is the second remaining major cause of reduction in effective voltage from the voltage which is theoretically available. The phenomenon of electrode polarization has long been known and is referred to, for instance, in Glasstone's "Textbook of Physical Chemistry" at page 1026 (2nd edition, D. Van Nostrand Co., Inc., 1946); by G. V. Kortüm and J. O'M. Bockris in "Electro-Chemistry" at pages 400 et seq. (Elsevier Publishing Company, New York and Amsterdam 1951); and more recently has been analyzed mathematically by M. Eisenberg in his chapter "Thermodynamics of Electro-Chemical Fuel Cells" starting at page 35 in the above-mentioned monograph "Fuel Cells."

There are four types of polarization occurring in fuel cells. The first of these, concentration polarization, has been a major limiting factor in the amount of power and the available voltage which can be developed from fuel cells using aqueous electrolytes. Concentrations of the tion results from deviations in the concentrations of the hydroxyl and hydrogen ions in the layer of an aqueous liquid electrolyte immediately adjacent the surface of an electrode from their concentrations in the bulk of the electrolyte. Such layer is called the ionic diffusion layer. Gradients in electrolyte concentration in the ionic diffusion layers adjacent closely spaced electrodes of an electrolysis cell are referred to by M. Quintin and R. Viltange in Comptes ren. l'Académie des Sciences, vol. 250, pp. 840–42 (1960).

The three remaining types of polarization are called chemical polarization, gas side concentration polarization and resistance polarization (which is not the same as ohmic resistance) and are of lesser significance than concentration polarization in the design, operation and power production of fuel cells using an aqueous electrolyte.

The adverse effects of polarization of fuel cells has resulted in the development of cells which operate at high temperatures, because polarization is reduced at high temperatures. Some high temperature fuel cells use a molten alkali metal carbonate as the electrolyte; cells of this type are illustrated in U.S. Pat. No. 2,980,749 and were described in 1921 by E. Baur, W. D. Trendwell, and G. Trumpler (Z. Elektrochem., vol. 27, p. 199). Other high temperature cells use a solid electrolyte, such as those made of clay, various metal oxides, etc. These electrolytes are non-aqueous and the fuel cells using them must be operated at temperatures of 500° C. and higher.

Fuel cells using aqueous electrolytes and porous gas diffusion electrodes also have been operated at high temperatures, about 200° C., which requires using high pressures (e.g., 10–40 kg./cm²) on the electrolyte in order to maintain it in the liquid phase, and consequently using high pressures on the reducing and oxidizing gases charged to such a fuel cell. Maintaining such high temperatures requires either auxiliary means to heat the cell or dissipation of a portion of the cell's energy to heat, which may be done by spacing the electrodes further apart. Elevated temperatures of 200° C. and greater obviously require insulation of the cell from its surroundings. In addition, the use of high pressures requires energy to compress the reducing and oxidizing gases, and the energy so used must be subtracted from the electrical power produced by the cell in computing its efficiency. A fuel cell of this character is described in F. T. Bacon's British Pat. No. 667,298 and further described in the chapter "The High Pressure Hydrogen-Oxygen Cell" co-authored by F. T. Bacon in the monograph "Fuel Cells."

A variation of the high temperature, high pressure fuel cell using an aqueous electrolyte is disclosed in Niederreither's U.S. Pat. No. 2,070,612 and German Pat. Nos. 648,940–941. In this fuel cell, the oxygen and hydrogen are not supplied to the electrodes in the gas phase but are instead supplied dissolved under high pressure in liquids, which may be denominated the anolyte and the catholyte, respectively. The dissolved oxygen and hydrogen react at the rear surfaces of the electrodes in contact with the anolyte and catholyte and never pass through the electrodes in order to reach their respective active front surfaces. The electrode surfaces of opposite polarity (at which the electrochemical reactions occur) do not confront each other but instead are separated by the combined thickness of the electrodes and the thickness of an interposed carbon plate and a porous rubber or asbestos diaphragm. A non-circulating electrolyte is disposed within the pores of the diaphragm whose purpose is solely for conduction of current between electrodes. This cell also becomes polarized if operated at ambient temperatures.

It is, therefore, an object of this invention to provide an aqueous eletrolyte fuel cell having porous gas-diffusion electrodes which may be operated at much lower temperatures, from ambient temperature up to about 70° C., and without the use of elevated gas overpressures, which suffers less from concentration polarization and hence produces a greater current at a given useful voltage.

It has now been discovered that the objective of this invention may be achieved if the porous gas-diffusion electrodes of an aqueous electrolyte fuel cell are spaced apart at a distance less than the maximum thickness of the ionic diffusion layer of the electrolyte, e.g., less than about 0.5 mm., and the electrolyte is circulated past the electrode surfaces at a rate sufficient to maintain the electrolyte concentration at a desired level.

The fuel cells utilizing this invention are provided with a casing and at least one positive electrode and at least one negative electrode. However a plurality of pairs of electrodes may be used. The electrochemical reaction generating the electricity occurs generally at the front (or first major) surface of the electrode which is adjacent to the electrolyte and directly facing a similar reactive surface of an electrode of opposite polarity. The reducing and oxidizing gases are individually supplied in the gas phase to the rear of the surface of the electrode opposite the first surface thereof in contact with the electrolyte, and diffused through the electrode to the first surface. The electrolyte-contacting surfaces of the electrodes of opposite polarity are disposed at a distance of less than the maximum ionic diffusion layer of the electrolyte, i.e., at a distance in the range of from about 0.05 to about 0.5 mm. The spacing between the electrodes advantageously is maintained by means of a spacer or separator of a design which permits the circulation of the electrolyte.

The fuel cell is provided with means adapted for supplying separate streams of oxidizing gas and reducing gas to the rear locations of the appropriate electrodes, and is further provided with means adapted to supply a liquid aqueous electrolyte to the cell and to circulate the electrolyte between electrode surfaces of opposed polarity.

A fuel cell so constructed has the advantage that it can be operated at low temperatures, from ambient up to about 70° C., and at low overpressures, not exceeding about 1 kg./cm.², of the oxidizing gas, reducing gas and aqueous liquid electrolyte. Despite the use of such low temperatures and overpressures, the cell may be operated for sustained periods without a loss in power on account of polarization concentration comparable to the loss which occurs with fuel cells having wider electrode spacings. It will produce a greater current density and more power than is predictable, in accordance with well known laws of electricity based upon experimentally determined current increases as the electrode spacing is reduced solely within the range of from 10 to 1 mm., as a result merely of reducing the electrode spacing to less than 0.5 mm. The fuel cells and their method of operation herein disclosed provide an unexpected increase in electrical current at a specified voltage (e.g., 500 millivolts) in the range of useful electrical power output, which increase is greater than 1, and sometimes greater than 1.5–2, as measured by the Stani Factor as hereinafter defined.

The electrodes used in this invention are of the porous gas-diffusion type which are constructed to have a first major surface in contact with the electrolyte of the cell, and to be supplied with a gas at a location *to* the rear of such first surface and to permit the gas to pass through the electrode towards the first major surface. Generally, the gas is supplied at the rear surface of the electrode.

Porous gas-diffusion electrodes are already known in the art. They may be made of carbon, advantageously having a catalytically active metal deposited on the major surface to be in contact with the electrolyte, and also of such metals as iron, silver, nickel, cobalt, platinum, etc. They are often made from sintered or compressed metal powder. Inasmuch as fuel cells involve an electrochemical reaction catalyzed by the electrodes, the chemical characteristics of the electrodes will influence the electrochemical reaction rate, and the current and power produced and voltage developed by the cell. However, the successful practice of the invention is not dependent upon selecting any particular type or combination of electrodes. A number of electrodes which may be used are referred to hereinafter for illustrative purposes. Naturally, the electrodes should be of a material which is not corroded or otherwise attacked by the electrolyte, gases, or reaction products.

A characteristic of the electrodes is that they are porous. The necessary porosity of the electrodes is determined by the velocity of the flow of the gases through them, such velocity corresponding necessarily to the reaction rate in order to prevent the entrance of gas into the electrolyte disposed between electrodes. In order to have a sufficiently high rate of ionization of the gases, it is important that the three phases—solid electrode, liquid electrolyte and the gaseous fuel or oxidant—co-exist, preferably along the surface of the electrode in contact with the electrolyte. To this end, it is advantageous that the porous electrodes not be saturated with electrolyte, this condition being obtained by co-ordinating the following parameters: the pressure on the electrolyte; the overpressures of the gases; the temperature; and the internal dimensions of the porous electrodes. Advantageously, the circulating electrolyte is at a pressure somewhat less than the pressures on the gas, thus avoiding inhibition (saturation) of the electrodes with electrolyte, but not so much less as to permit the gases to enter the electrolyte. Moreover, the efficiency of the cell is improved if the surfaces or faces of the electrodes which are in contact with the electrolyte have smaller pores than the remaining portions of the electrode to the rear thereof. Furthermore, the physical nature of the porous inert electrodes must necessarily insure the existence of gas overpressures consistent with the proper operation of the cell, such overpressures being preferably less than 1 atmosphere. This condition is obtained by using porous electrodes of such porosity that the loss of pressure resulting from the passage of the gases through the electrodes remains less than the overpressure on the gas.

The electrodes are normally in the shape of a thin disc or rectangle, having a relatively smooth first major surface (as distinct from the thin edge surface) adapted to contact the electrolyte. Although such major surface is smooth to the touch, microscopic examination reveals a multiplicity of small (about 2–50 microns) pores which characterize the electrodes. The confronting first surfaces of electrodes of opposite polarity are designed to be substantially parallel. This is most easily done by making them planar, but they may also be shaped as segments of cylinders or spheres. The rear surfaces may also be planar, or they may be shaped to facilitate supply of the gases to them.

The electrodes may be of varying thickness, from a fraction of a millimeter to about five millimeters. Although the thinner electrodes have the desirable characteristics of compactness and less weight, which are important in military and space exploration uses of fuel cells, they suffer from greater concentration polarization than electrodes of greater thickness, as is explained further herinafter. Hence, cells constructed and operated according to this invention have particular utility for such uses.

It is advantageous that the electrolyte not penetrate too far into the electrodes. This objective may be achieved by using electrodes having a very low porosity, on the order of 2–5 microns, along the surface of the electrodes in contact with the electrolyte. Alternatively, it may be obtained by disposing an extremely thin coating of a water-repellant material along the solid surfaces of the electrode throughout the thickness thereof from which it is desired to exclude the electrolyte.

The confronting first surfaces of the electrodes of opposite polarity which are in contact with the electrolyte are spaced apart at a distance which is less than the maximum thickness of the ionic diffusion layer of the aqueous electrolyte. In order to achieve this, it has been shown that the inter-electrode gap should not exceed a few tenths of a millimeter, e.g., in the range of from about 0.5 mm. to about 0.05 mm., and preferably in the range of from 0.1 mm. to 0.2 mm.

When the cell is operating, water is formed at the rate of 0.33 cm.$^3$ per ampere-hour and must be eliminated. As a matter of fact, if this water is not removed, it will alter the density as well as the concentration of the electrolyte and the conditions of reactive equilibrium while are described hereinabove.

It will be readily appreciated that the smaller the initial quantity of electrolyte, i.e., the smaller the interelectrode gap, the greater the disturbing influence of the water formed during the operation of the cell. It is for this reason that the inter-electrode gap cannot be reduced to less than .05 mm. (which would be a particularly favorable dimension). The solution proposed hereinabove which consists in keeping this gap preferably within the range of .1 to .2 mm. may therefore be considered as a compromise taking due consideration of the contradictory requirements already set forth herein, that is, having the electrodes as closely spaced as possible from each other and leaving a quantity of electrolyte sufficient to prevent the water resulting from the recombination reaction, during a reasonable time interval, from detrimentally altering the density of the electrolyte, which is to kept within proper limits.

The inter-electrode spacing may be maintained by known mechanical means. Advantageously, the spacing is maintained by the use of separators made of a non-conducting material which is inert with respect to the liquid aqueous electrolyte, e.g., nylon or other polyamid materials such as "Rilsan," asbestos or glass fibers. It is necessary that the separator permit the circulation of the electrolyte through the gap formed between the electrodes in order to permit the removal from it of the water formed during the operation of the fuel cell.

When using fuel cells embodying the close inter-electrode spacing required by this invention, it is possible to operate the cell for extended periods under sustained power output at relatively low temperatures, from ambient to about 70° C. Using an aqueous liquid electrolyte and such low temperatures avoids the need to operate at high pressures and normally such a fuel cell will be operated at overpressures less than about 1 kg./cm.$^2$. This avoids having to expend mechanical energy to compress the reducing and oxidizing gases fed to the cell. The pressures under which such gases are supplied are frequently different and need only be sufficiently greater than the pressure under which the electrolyte is maintained to assure that the molecules of the gas pass through the porous electrodes and arrive at the solid-liquid-gas three-phase interface referred to above at a point adjacent to the inter-electrode gap. However, the gas pressures must not be so great to cause the gases to bubble into the electrolyte, thereby impairing the efficient operation of the cell and furthermore forming a potentially explosive mixture. Normally the overpressure on the electrolyte between the electrodes will be merely sufficient (a few centimeters of mercury) to provide for the circulation of the electrolyte, and the incremental additional overpressure on the oxidizing and the reducing gases will be in the range of about 1–7 cm. of mercury.

The liquid electrolyte is typically an aqueous solution of an alkali metal hydroxide, suitably KOH. Aqueous potassium hydroxide solutions have the following resistivities:

| KOH solution, specific gravity: | Resistivity, ohm./cm. |
|---|---|
| 1.075 | 3.7 |
| 1.10 | 2.95 |
| 1.15 | 2.2 |
| 1.20 | 1.9 |
| 1.25 | 1.8 |
| 1.30 | 1.85 |

The minimum resistivity (about 2.85 ohm./cm.) of sodium hydroxide solutions occurs at a specific gravity of about 1.14.

Acidic aqueous liquid electrolytes are also known and usable, but are less desirable because of the corrosion they cause.

At the outset, it may seem rather surprising that the operation of the hydrogen-oxygen cell may be so strongly improved by reducing the gap between the electrodes.

The following considerations constitute an attempt at explaining this result, but it will be readily understood that the practical vaue of this invention would not be impaired by possible inaccuracies in these hypotheses.

The reactions taking place at the electrodes of a fuel cell may be summarized schematically as follows:

If $H_2$ is the reducing gas and $O_2$ the oxidizing gas, we have:

$H_2 \rightarrow H_2$ adsorbed $\rightarrow 2H \rightarrow 2H^+ + 2e$ at the negative pole
$O_2 \rightarrow O_2$ adsorbed $\rightarrow 2O + 4e \rightarrow 2O^=$ at the positive pole, or alternately, $O_2 \rightarrow O_2$ adsorbed $\rightarrow 2O + 2H_2O + 4e \rightarrow$
$4OH^-$ ($e$ being an electron)

Therefore, at the solid-liquid-gas interface $H^+$ ions are formed at the anode and $OH^-$ ions are formed at the cathode. To permit the passage of electric current, these ions (i.e. the corresponding atoms) must necessarily combine with one another.

For a given catalyst and a given surface area, the number N of ions formed per unit time at the interface depends on the temperature and pressure of the initial gas, but also on the concentration of these ions at the interface. An ionic-polarization layer fed by diffusion will build up on both electrodes and the cell cannot deliver current unless these layers disappear, that is, if a reciporcal depolarization takes place. If the two electrodes are moved toward each other, the distance through which an ion must travel to meet an opposing ion decreases, the chances that these ions meet each other increase and the deplorization is facilitated.

Thus, by reducing the inter-electrode gap to less than or equal to the maximum ionic diffusion layer, aqueous electrolyte fuel cells can be made which, providing that the average concentration of the electrolyte can be maintained at a desired level, are capable of producing high current densities and are adapted to operate at room temperature and at overpressures (i.e., pressures above atmospheric pressure) less than 1 kg./cm.²

In the attached drawings and by way of example only:

FIG. 9 shows the voltage current curves illustrating the influence of the nature of the positive electrodes;

FIG. 13 shows additional curves illustrating the variations in current density as a function of the electrode gap; and FIG. 14 shows curves illustrating the variations in power produced per unit of electrode surface based upon the current density-voltage data of FIG. 13.

Figure 1:
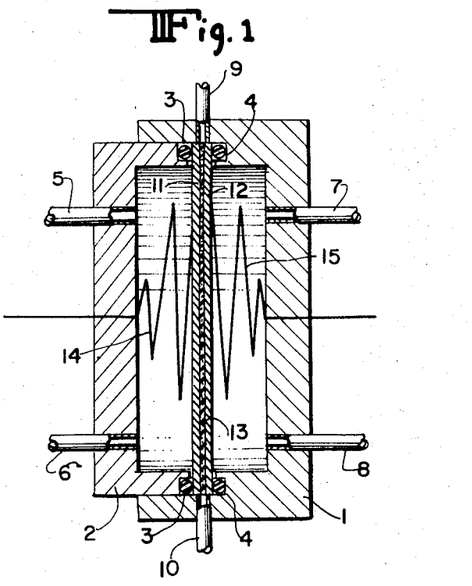
FIG. 1 shows in diagrammatic form a cell constructed according to the teachings of this invention.

In the form of embodiment exemplified in FIG. 1, the cell comprises an enclosure consisting for example of a pair of interfitting members 1, 2 having sealing gaskets 3, 4 interposed therebetween. Two orifices 5, 6 are formed through the wall of member 2 to constitute the gas inlet and outlet, and similar orifices 7, 8 are formed in the opposite member 1, as shown. In the example illustrated it is the member 1 that fits on the outer wall of member 2 and this member 1 has formed a pair of orifices 9, 10 through its top and bottom walls respectively as shown. These orifices 9, 10 extend substantially along the longitudinal axis of the cell and whilst the upper orifice 9 receives fresh electrolyte, the lower orifice 10 eliminates the worn electrolyte.

Clamped between the sealing gaskets 3, 4 of member 1, 2 are a pair of electrodes 11, 12 of porous metal, one or more separators 13 being possible interposed therebetween. These separators may consist of nylon or any other suitable material such as asbestos or glass fibres. According to a particularly advantageous form of embodiment of this invention, the circulation of the electrolyte may be facilitated by fitting between the electrodes spacing-means adapted to maintain the requisite gap between the electrode. Springs 14, 15 or equivalent means are provided for properly positioning the electrodes 11 and 12 and prevent any undesired movement thereof while acting as current leads to and from the electrodes.

The electrolyte is fed into the very narrow gap left between the two electrodes 11 and 12, which is already explained, may be of the order of .15 mm. This electrolyte may consist for example of 5 N potash.

In practice, an electrolyte circulation, either of the forced type obtained by means of an external pressure consistent with the gas pressure, or of the capillary type, is established.

Typical forms of embodiment of cells constructed according to the teachings of this invention will now be described by way of example together with the results of the various tests accomplished therewith.

Sintered plates of the type utilized to constitute the supports of the active materials of alkaline storage batteries have been used. These plates had the following characteristics:

| | |
|---|---|
| Thickness | 1–2 millimeters. |
| Porosity | About 85%. |
| Pore size | 20–50 microns. |

These plates had been strongly pressed to reduce their thickness by 70%, the pore size being thus reduced to less than 5 microns (for example 2 microns).

The plates themselves may be manufactured according to the double sintering process. In this process, a normally sintered plate is first prepared (this plate being preferably compressed beforehand) and then has a fresh layer of nickel powder applied on one side, the whole being sintered another time without compression. Thus, a plate having two zones characterized by different degrees of porosity is obtained. In the final cell assembly the denser portion is that which contacts the electrolyte.

These plates were placed in the reaction chamber which was subsequently filled with either a lightly compressed nickel powder, or nickel felted fabric. This last embodiment proved to be particularly advantageous for the following reasons:

Firstly, it permits of increasing the ionization rate by increasing the adsorption surface area.

Then, it ensures an ultimate gas purification by eliminating the noxious components of the active catalyst.

Finally, this powder or this fabric when contaminated may be easily replaced without interfering with the electrodes proper, which is an appreciable practical advantage.

With a cell of this type, an open-circuit E.M.F. of the order of 1.1 to 1.15 volt was obtained.

This cell was capable of delivering currents of a density approximately 1 ma./cm.$^2$.

In this case the E.M.F. dropped to about 1 v.

These results were obtained at room temperature with gas overpressures not exceeding 1 kg./cm.$^2$.

Figure 4:
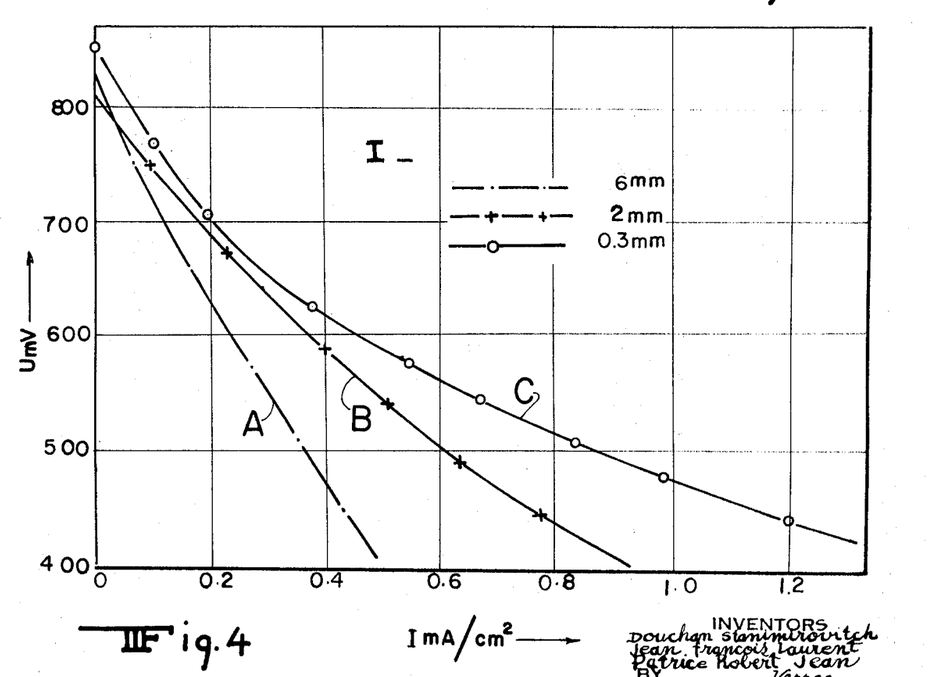
FIG. 4 shows the curves illustrating the variations in the current density as a function of the electrode gap.

Referring now to FIG. 4, it will be seen that the electrode gap had a considerable influence on the operation of the cell. In fact, curve A plotted for an electrode gap of about 6 millimeters proves that at 500 millivolts the current density is .37 milli-ampere per cm.$^2$. With the same voltage, in a cell having its electrodes spaced only 2 mm. apart, the current density becomes .6 ma./cm.$^2$, whereas if the gap is reduced to .3 mm., the current density is .86 ma./cm.$^2$ (see curves B and C). These figures prove clearly the pertinence of the essential characteristics set forth hereinabove.

The unexpectedly large increase in current density obtainable from a fuel cell by reducing the spacing between the active surfaces of the electrodes to the range of 0.05 to 0.5 mm. is further depicted in FIGS. 13 and 14. The data for FIGS. 13 and 14 were obtained from fuel cells having a hydrogen electrode comprised of porous active carbon coated with palladium on its planar first surface in contact with the electrolyte, The oxygen electrode comprised porous active carbon coated with silver on its planar surface. Gaseous hydrogen and oxygen were supplied to the rear portions of the electrodes at overpressures of 0.110 and 0.046 kg./cm.$^2$, respectively. The electrolyte was a 5 N aqueous solution of potassium hydroxide circulating between the electrodes at 40 ml./hour and at an overpressure of 0.030 kg./cm.$^2$. The cell was operated at 20° C.

The external circuit of the cell comprised a variable resistance having an accuracy of 0.05%. A millivolt meter having a high input impedance (10$^{13}$ ohms) connected across the terminals of the cell was used to read directly the operating cell voltage. Measurements of the voltage produced at various settings of resistance in the external circuit were taken for electrode spacings of 0.9, 0.4 and 0.2 mm. between the active surfaces of the electrodes. The current and power produced by the cell per square centimeter of electrode surface were computed and are plotted in FIGS 13 and 14, respectively, as a function of the cell's voltage. At the electrode spacing of 0.9 mm., the current density and the power produced by the cell at 500–600 millivolts are significantly less than when the electrode spacing was 0.2 and 0.4 mm.

The increase in current density and power at constant voltage which results when practicing this invention is unexpectedly greater than predicted based upon fuel cells having electrode spacing greater than 0.5 mm. The "Stani Factor" described in the following paragraphs is a measure of the increased benefit obtained as a result of the invention.

When the spacing between the electrodes of a fuel cell is reduced through the range of 10 to 1 mm. and all other factors (i.e., cell construction and operation) are maintained the same, some increase in current density results because the ohmic resistance caused by the electrolyte is reduced. Since for an electrolyte of specific composition such resistance is a linear function of the distance between the electrodes, the predicted increased current (PIC) per millimeter of reduction in electrode spacing is determined by the formula $$\frac{I_2-I_1}{d_1-d_2}=PIC \text{ (amperes/cm.}^2\text{/millimeter)}$$

In the formula, "I" represents current density and "d" represents the electrode spacing. In any specific fuel cell, various pairs of electrode spacings in the range of 10 to 1 mm. may be used to predict the increased current obtainable by reducing the spacing an additional amount. Thus, using the data of FIG. 4 at 500 millivolts, the current density at a 6 mm. spacing is 0.37 ma./cm.$^2$, and at a 2 mm. spacing is 0.60 ma./cm.$^2$. According to the foregoing PIC formula, the predicted increased current is 0.0575 ma./cm.$^2$/mm. Using the PIC value so determined for electrode spacings above 0.5 mm. to calculate the increased current to be obtained by reducing the spacing from 2 mm. to 0.3 mm., i.e., to less than the maximum ionic diffusion layer, a value 0.098 ma./cm.$^2$ is obtained. As FIG. 4 shows, however, the actual increase in current is not 0.098 ma./cm.$^2$, but 0.26 ma./cm.$^2$. The experimentally verified current gain resulting from reducing the spacing from 2 mm. to 0.3 mm. is 0.153 ma./cm.$^2$/mm., which is much greater than expected.

The Stani Factor has been devised as a measure of the benefit obtained by practicing the invention. The Stani Factor is the quotient of (a) the increased current density per millimeter of electrode spacing change actually obtained when such spacing is reduced from in the range of 0.7 mm. to 2 mm. to less than 0.5 mm., divided by (b) the increased current density per millimeter of the electrode spacing change as made in (a) above which is calculated based upon the foregoing PIC formula as applied to measurements of the current density produced at pairs of electrode spacings in the range of 1 to 10 mm. It is to be understood of course that the current measurements and calculations must be at the same voltage, e.g., at a voltage in the range of 400–600 millivolts, such as 500 mv., and must be on fuel cells which are constructed and operated in precisely the same manner, except for the electrode spacing.

The unexpected results demonstrated above in respect of the data of FIG. 4 may also be noted in FIGS. 13 and 14, but when increasing the electrode spacing from less than to more than the ionic diffusion layer. Referring to FIG. 13 and at a constant cell voltage of 550 mv., doubling the electrode spacing from 0.2 mm. to 0.4 mm. results in reducing the current density by only 1.2 ma./cm.$^2$ (from 38.0 to 36.8 ma./cm.$^2$), equal to 6 ma./cm.$^2$ per millimeter change in spacing. However, increasing the electrode spacing from 0.4 mm. up to 0.9 mm., and thus exceeding the maximum ionic diffusion layer, results in a much greater reduction in current density, about 13.2 ma./cm.$^2$, equal to 26.4 ma./cm.$^2$ per millimeter of change.

The Stani Factor for fuel cells having electrode spacings of 0.05 to 0.5 mm. is above 1 (unity), generally greater than 1.1, and may be 1.5–2 or above, as was illustrated in using the data of FIG. 4, where the Stani Factor was 2.6.

The behavior of the different electrodes taken separately has also been carefully considered.

According to a typical feature of this invention, the negative electrodes are selected and constructed with a view to render their behavior independent of at least one of the following parameters: the nature of the positive electrode opposed thereto, the density of the current delivered by the cell, and the operating temperature.

All the tests reported herein were performed with cells comprising two electrodes spaced less than 0.5 mm. from each other. Careful consideration was given primarily to the electrodes proper and to their influence on the cell operation.

The negative electrode, that is, the one receiving the reducing gas, for example hydrogen, may be prepared in various ways. Its potential, measured in relation to that of a reference electrode, for example of metallic silver, is selected to define its behavior. The establishment and constitution of electrodes of this character should be governed by one or more factors on which depends the operation of the cell. On the one hand, the negative electrode should be as much as possible independent of the nature of the positive electrode with which it is associated. The density of the output current should not influence the manner in which this electrode operates. Finally, this behavior of the negative electrode should practically not be appreciably influenced by the operating temperature.

What is remarkable in the operation of the negative electrode herein described is that under practical conditions it will operate satisfactorily even if it is not pressurized. Experiments prove that a hydrogen overpressure of a few cm. of Hg, for example, 3 to 5 cm., is sufficient to obtain a very satisfactory operation of the negative electrode of this invention.

It was observed that a negative electrode consisting of two plates preferably of porous structure, or two sponges of sintered metal such as nickel, having sandwiched therebetween a layer of said metal in the form of a very finely divided powder, could be particularly valuable. Preferably, the porosity of the sintered nickel sponge or plate which contacts the gases should be at the most equal to the porosity of the plate or sponge contacting the electrolyte, which is opposite thereto, but this is not a must. Thus, for example, plates of a thickness ranging from 0.9 to 1.1 mm. may be used on the gas inlet side, and plates of a thickness ranging from 0.5 to 0.8 mm. may be used on the electrolyte side. The intermediate layer for example of metal powder may be 2.5 to 3.5-millimeter thick. A material particularly adequate for this specific application is one of the so-called Raney metals. Raney metals are obtained by attacking by means of an alkaline solution, for example a soda solution, an alloy consisting of nickel metal and of aluminum. The latter dissolves and there remains a mass of fine metal powder. The thus prepared Raney nickel is particularly suitable, but Raney cobalt is also valuable for the purposes of this invention.

Of course, materials having the same porosity may be used for preparing the two plates between which the layer of metal powder is to be sandwiched. In this case, it will be advantageous to form through the plate which is to have the major porosity, a plurality of orifices of a diameter of about 0.2 to 0.3 mm.

This negative electrode was used by opposing it to positive electrodes of various types, and it was thus observed that its operation was quite independent of the nature of said positive electrodes. Moreover, it was discovered quite surprisingly that the current density of the cell, which varied from 0 to 250 milliamperes per cm.$^2$, had no influence at all on the electrode potential, of which the drop was only about 0.050 volt.

Furthermore, these negative electrodes were operated at temperatures varying from 23 to 70° C. without observing appreciable differences.

Figure 2:
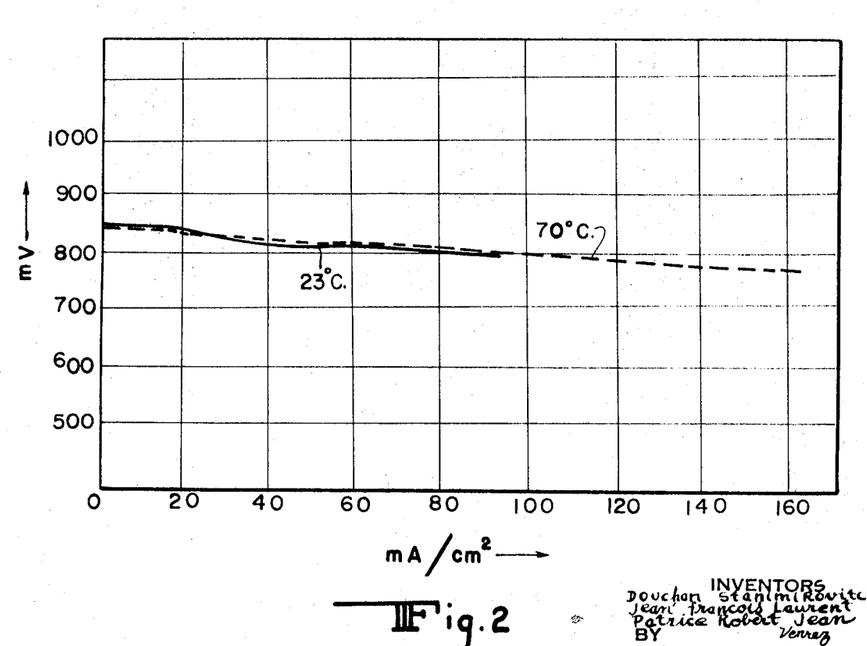
FIG. 2 is a plot showing the operating curves of a negative electrode at two different temperatures.

In FIG. 2, the two curves plot the potential as a function of the current density in the case of two extreme temperatures, that is, 23 and 70° C. Surprisingly enough, it was observed that these two curves were practically the same.

Tests were also made with the positive electrodes. To fully appreciate the behavior of these electrodes in the cell of this invention, a principle identical with that applied to the case of the negative electrodes was adhered to, that is, the measurement of the potential with respect to a reference electrode of metallic silver. It appeared immediately that the behavior of a positive electrode, irrespective of its nature, is essentially variable. The factors governing this variation depend on the very nature of the electrode, the density of the current output and the temperature.

According to the present state of knowledge in the art, it is known that the compartment of the positive electrode is by its very nature a cathode compartment, that is, the place where the electrons converge from the external circuit through the electrode. This compartment becomes under these conditions, the seat of secondary reactions of which the speed is influenced by the three factors set forth hereinabove.

From this preliminary statement, a series of different positive electrodes were considered.

The tests were standardized in that all the positive electrodes had no apparent active surface of the order of 1 cm$^2$., that the oxygen overpressure was of the order of a few centimeters of mercury, and that the electrolyte utilized in these tests consisted uniformly of a 5 N potash solution. The rate of flow of the electrolyte was of the order of 10 cm.$^3$ per hour. Between the two electrodes there was a separator made from a material known in the trade under the name of "Rilsan," which had a thickness of about 0.3 mm.

The results obtained with the various electrodes are summarized in the following tables:

(1) Sintered electrode of carbonyl nickel, about 2 mm. thick. At room temperature, the following results were observed:

| Current density | 5 ma./cm.$^2$ | 20 ma./cm.$^2$ | 30 ma./cm.$^2$ |
|---|---|---|---|
| Negative potential, v | .85 | .85 | .85 |
| Positive potential, v | .20 | .40 | .53 |
| Potential difference, v | .65 | .45 | .32 |
| Power/cm.$^2$, mw | 3.25 | 9.0 | 9.6 |

(2) Pure silver sintered electrode, about 1 mm. thick. The test was conducted at room temperature and gave the following results:

| Current density | 5 ma./cm.$^2$ | 20 ma./cm.$^2$ | 30 ma./cm.$^2$ |
|---|---|---|---|
| Negative potential, v | .85 | .85 | .85 |
| Positive potential, v | .22 | .38 | .45 |
| Potential difference, v | .63 | .47 | .40 |
| Power/cm.$^2$, mw | 3.15 | 5.40 | 12.00 |

(3) Porous carbon electrode mixed with a synthetic resin, according to the method set forth in U.S. patent application Ser. No. 69,137, filed Nov. 14, 1960, now U.S. Pat. No. 3,193,414 for "Porous Electrode Permeable to Gases and Impervious to Liquids."

The test was carried out at room temperature and gave the following results:

| Current density | 5 ma./cm.$^2$ | 20 ma./cm.$^2$ | 30 ma./cm.$^2$ |
|---|---|---|---|
| Negative potential, v | .85 | .85 | .85 |
| Positive potential, v | .15 | .38 | .52 |
| Potential difference, v | .70 | .47 | .33 |
| Power/cm.$^2$, mw | 3.50 | 9.40 | 9.9 |

(4) Electrode of sintered, silver-impregnated nickel, about 2 mm. thick.

This electrode was prepared by immersing in a silver nitrate solution a support of sintered nickel. The silver deposit was then obtained through the reducing action of hydrazine or of formaldehyde.

With this procedure a uniform distribution of the silver throughout the thickness of the nickel layer lining the walls of the sintered supports can be obtained.

The test was carried out at room temperature.
The results are summarized in the following table:

| Current density | 5 ma./cm.² | 20 ma./cm.² | 40 ma./cm.² | 90 ma./cm.² |
|---|---|---|---|---|
| Negative potential, v | .85 | .85 | .84 | .83 |
| Positive potential, v | .14 | .32 | .41 | .66 |
| Potential difference, v | .71 | .53 | .43 | .17 |
| Power/cm.², mw | 3.55 | 10.60 | 17.2 | 15.3 |

The same experiment was repeated at a temperature of 70° C. and the results are summarized in the following table:

| Current density | 5 ma./cm.² | 20 ma./cm.² | 40 ma./cm.² | 90 ma./cm.² | 170 ma./cm.² |
|---|---|---|---|---|---|
| Negative potential, v | .85 | .85 | .84 | .83 | .79 |
| Positive potential, v | .01 | .04 | .08 | .18 | .33 |
| Potential difference, v | .86 | .81 | .76 | .65 | .46 |
| Power/cm.², mw | 4.4 | 16.2 | 30.4 | 58.5 | 78.5 |

(5) Carbon electrode prepared as set forth in §3 hereinabove but impregnated and coated with a very thin silver layer at least on the electrolyte side.

This electrode was prepared according to the same method as that set forth in §4 hereinabove, at least as far as the distribution of the silver layer is concerned.

The following results were recorded at room temperature:

| Current density | 5 ma./cm.² | 20 ma./cm.² | 40 ma./cm.² | 90 ma./cm.² |
|---|---|---|---|---|
| Negative potential, v | .85 | .85 | .84 | .83 |
| Positive potential, v | 0 | .14 | .21 | .38 |
| Potential difference, v | .85 | .71 | .63 | .45 |
| Power/cm.², mw | 4.25 | 14.20 | 25.2 | 40.50 |

Figure 3:
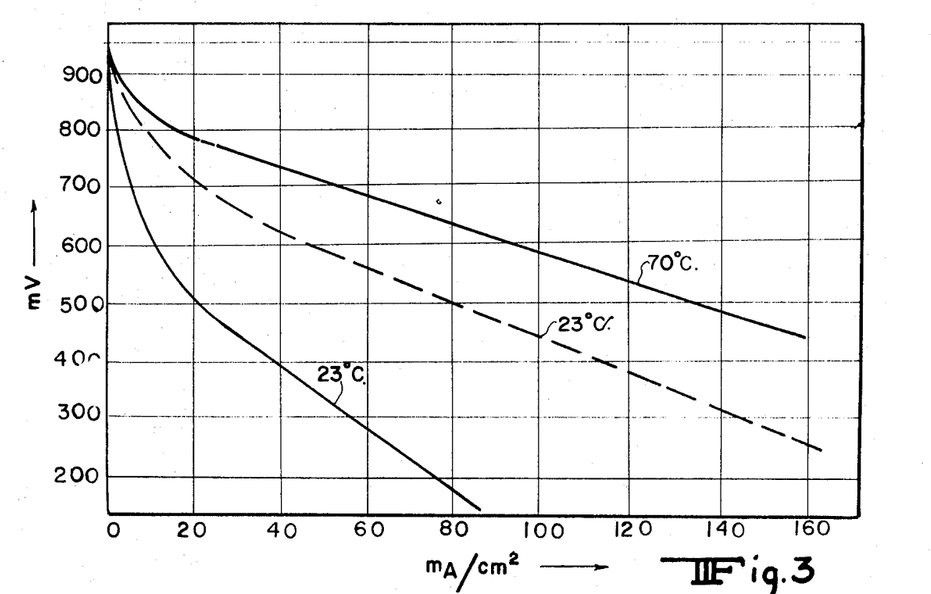
FIG. 3 is a similar graph showing the characteristic voltage-current density curves of fuel cells selected as typical examples of this invention.

In FIG. 3, the characteristic voltage values are plotted in ordinates against the current density values in abscissae at different temperatures.

The curves in solid lines relate to a cell of which the oxygen electrode consists of silver-impregnated sintered nickel, that is, an electrode obtained according to the description of §4 hereinabove, and the broken-line curve relates to a cell of which the oxygen electrode is obtained by means of carbon with a silver layer, as stated in §5 hereinabove.

The substantial voltage variations occurring as a function of the current density, of the nature of the oxygen electrode and of the temperature will be readily seen. It may be noted that in all cases the negative or hydrogen electrode utilized in these tests was the same electrode, prepared according to the details given hereinabove.

It is essential to note the importance of the results thus obtained. These results are definitely remarkable for they were obtained at room temperature or at a slightly higher temperature with very low hydrogen and oxygen over-pressures not exceeding 50 mm. of Hg. This affords a substantial constructional simplification in relation to existing fuel cells since it is no longer necessary to operate those cells at abnormally high pressures and temperatures. These results are in themselves of outstanding commercial value since hitherto unforseen power values are obtained, notably if the oxygen electrodes with porous support are silver-impregnated.

In the foregoing the necessity of preventing the electrodes from being soaked by the electrolyte and thus causing their pores to become filled with the electrolyte has already been emphasized; however, it must also be pointed out that the pressure or counter-pressure existing in this electrolyte should be sufficient to prevent the gases from flowing through the pores of the electrodes and mixing with the mass of electrolyte so as to produce an explosive mixture. It appears that this adjustment is particularly important. In fact, if the electrolyte impregnates the pores of the electrodes, the rate of diffusion of the gases is retarded and their absorption reduced, thus causing a reduction in the density of the output current.

If a value of 60 to 80 mm. of Hg above the atmospheric pressure is selected for the gas pressures, the electrolyte pressure should range from about 10 to about 20 mm. Hg above the atmospheric pressure.

According to a feature characterizing this invention, as the degree of polarization of the negative electrodes during the operation of the cell (for example in the case of a hydrogen cell) varies on the one hand as a function of the thickness of the metal (for example nickel) plates utilized, and on the other hand as a function of the nature of the metal utilized, this thickness as well as the nature of the plates (whether of sintered nickel, Raney metal, etc.) are so selected that the degree of polarization remains consistent with the future use of the cell.

As a matter of fact, it is known that during the operation of a fuel cell the hydrogen and oxygen electrodes act as the inner anode and cathode respectively. The hydroxyl ions of the electrolyte discharge themselves on the hydrogen electrode while the hydrogen ions discharge themselves on the oxygen electrode. Thus, molecular hydrogen develops on the positive electrode and molecular oxygen develops on the negative electrode. This gas accumulation creates a counter electromotive force causing the cell voltage to drop. Therefore, it is well to keep the degree of polarization at a value consistent with the proper operation of the cell. This is another object of the present invention.

It is another object of the present invention to determine the characteristics of the oxygen positive electrodes as well as their method of preparation.

Now the behavior of the negative and positive electrodes as a function of their compositions will be described.

Figure 5:
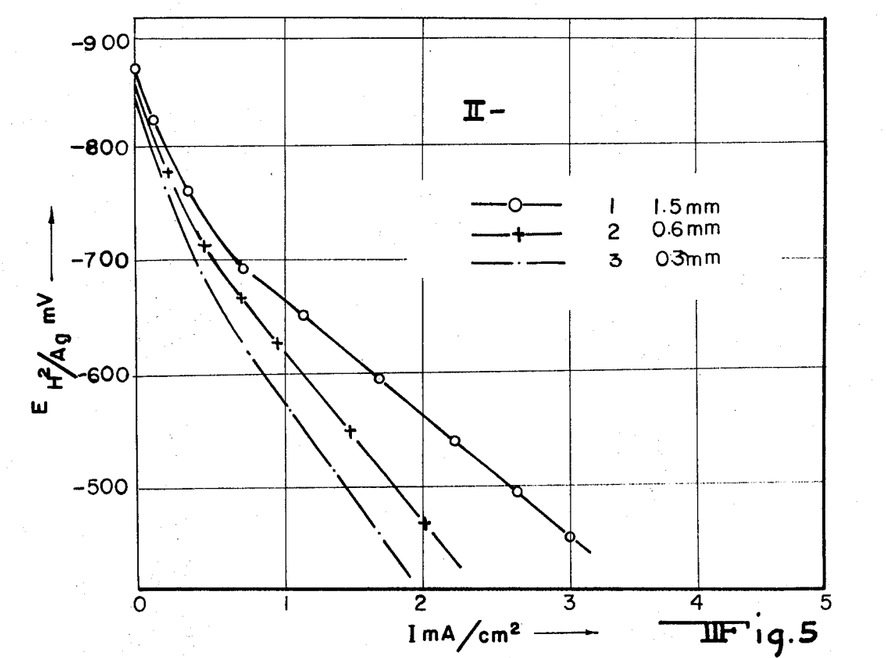
FIG. 5 is another diagram showing the curves illustrating the variations in polarization of the negative electrodes as a function of their thickness.
Figure 6:
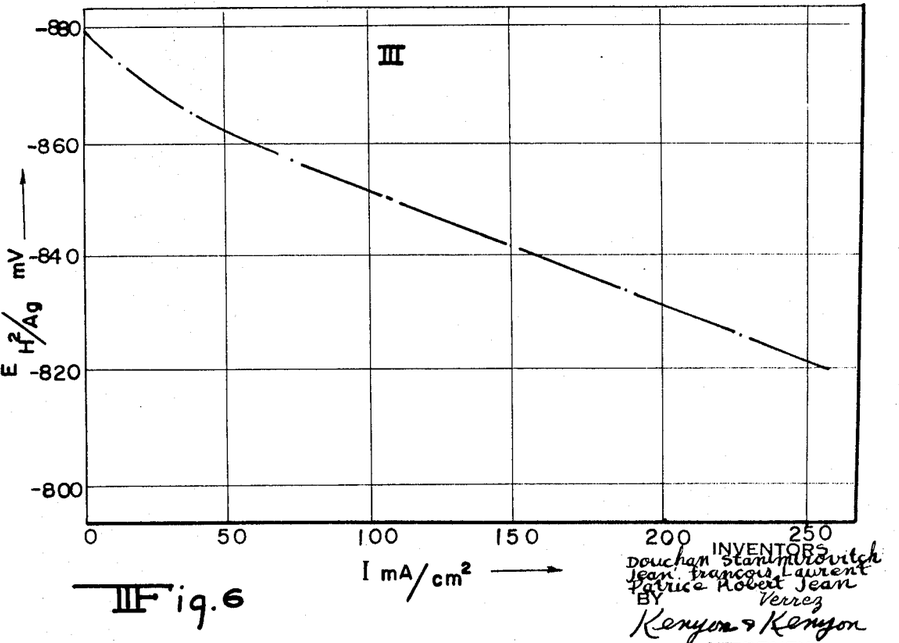
FIG. 6 shows a curve illustrating the effects of polarization on a negative electrode made from Raney nickel.

Referring to FIGS. 5 and 6 of the drawings, the following remarks may be made. When the nickel electrode is prepared from sintered nickel its degree of polarization during the operation of the cell varies very considerably as a function of its thickness. The ordinates show the potential in millivolts which is measured in relation to a reference silver electrode and plotted against the density of the output currents in abscissae. It will be readily seen that the effects of polarization are inasmuch felt as the thickness of the sintered nickel electrode is increased.

The increase in polarization as a function of the reduction in the electrode thickness may definitely be attributed to the reduction of the values of hydrogen likely to be adsorbed by the sintered material. The strong polarization of the sintered nickel electrodes may perhaps be attributed to a concentration polarization resulting from an increase in the concentration of water about the electrodes during the delivery of current, so as to cause a dilution of the electrolyte. However, it should be noted that tests proved that the velocity of flow of the electrolyte did not influence the polarization value. It is therefore possible that this polarization results simply from the fact that these electrodes have but a very moderate hydrogen-activating power.

In FIG. 6, the effects of polarization as observed on an electrode prepared from Raney metal are shown. The definitely more favorable aspect of the curve will be readily seen. In fact, the degree of polarization is much lower than in the case of sintered nickel electrodes.

It is therefore advantageous, in the case of a fuel cell according to this invention, to properly select the metal from which the negative electrode is to be prepared, as well as the thickness of the electrode, in order to obtain the desired degree of polarization.

Figure 7:
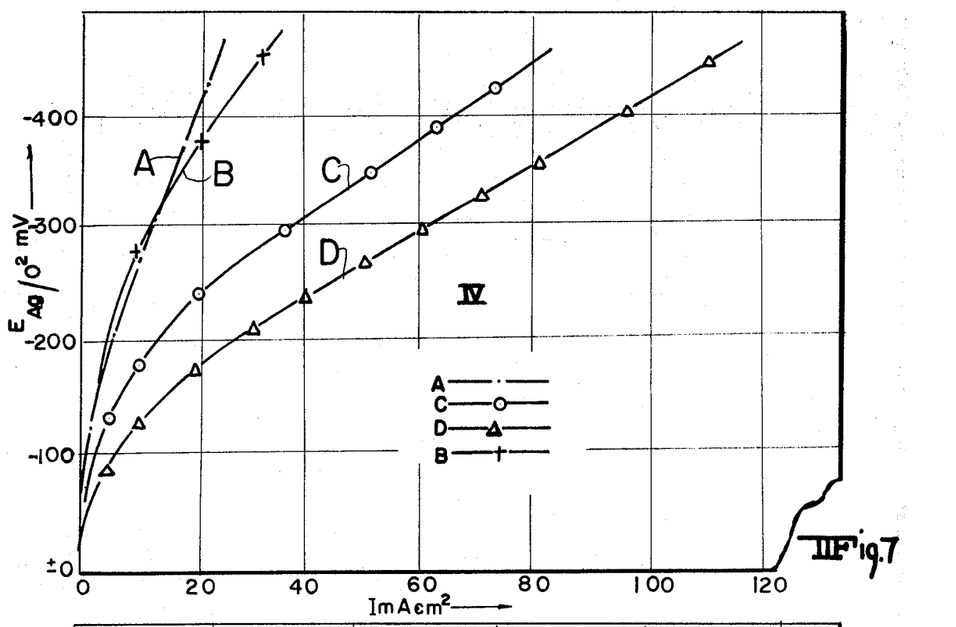
FIG. 7 shows curves illustrating the polarization of the positive electrodes made from sintered nickel.
Figure 8:
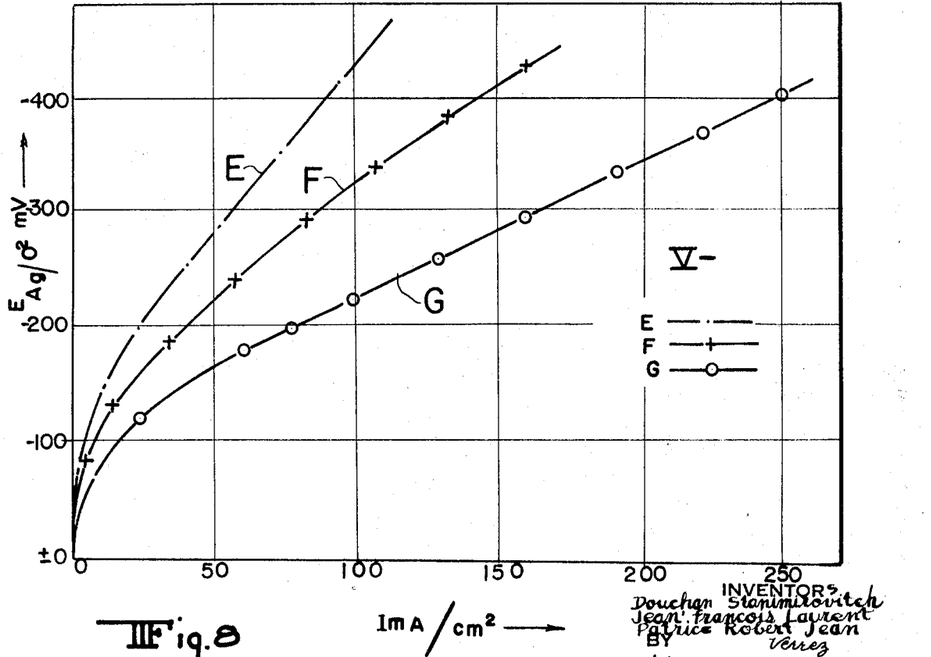
FIG. 8 shows curves illustrating the polarization of positive electrodes made of carbon.

Regarding the oxygen (positive) electrodes, the tests resulted in the curves shown in FIGS. 7 and 8. In FIG. 7, the use of sintered nickel (curve A), of sintered nickel containing 30% of silver (curve C), of sintered nickel coated with a silver film, .03 to .04 millimeter thick (curve D), and of sintered silver (curve B), are illustrated.

In FIG. 8, similar curves are shown in the case of carbon electrodes and more particularly curve E obtained with an electrode of pure active carbon, curve F obtained with an active-carbon electrode containing 30% of silver, and finally curve G obtained with a silver-coated electrode of active carbon.

From these curves it may be seen that after a sudden potential variation in the low-current range, the polarization becomes a linear function of the current values.

Of the six curves illustrated, curve A designates a sintered-nickel positive electrode, curve C a sintered-nickel positive electrode containing 30% of silver, curve D a sintered-nickel silver-coated positive electrode, curve B a pure active-carbon positive electrode, curve E a pure active-carbon positive electrode containing 30% of silver, and curve F an active-carbon positive electrode coated with a silver film.

For the sake of clarity, the results of the experiments have been summarized in the following table:

| | Density in ma./cm.$^2$ of the current obtained by utilizing as a material for the positive electrode— | | | | | |
|---|---|---|---|---|---|---|
| | Sintered Ni | Sintered Ni plus 30% Ag | Sintered Ni with silver coating | Active carbon | Active carbon plus 30% Ag | Active carbon with Ag coating |
| Voltage (volts): | | | | | | |
| .8 | | 2 | 3 | 1.5 | 4 | 9 |
| .75 | 1.2 | 7 | 9 | 4 | 13 | 23 |
| .70 | 3.2 | 16 | 18.4 | 9 | 27 | 46 |
| .65 | 6.5 | 29 | 32 | 18 | 45 | 80 |
| .60 | 10.0 | 44 | 47 | 26.2 | 66 | 116 |
| .55 | 13.2 | 58.5 | 62.5 | 39 | 87 | 153 |
| .50 | 16.2 | 73 | 78 | 52 | 110 | 190 |
| .45 | 20.0 | 88 | 95.5 | 64 | 157 | 238 |

The next table gives the power values of the cells which are calculated from these results.

| | Power values (in mw.) of cells wherein the positive electrode consists of— | | | | | |
|---|---|---|---|---|---|---|
| | Sintered Ni | Sintered Ni plus 30% Ag | Sintered Ni with silver coating | Active carbon | Active carbon plus 30% Ag | Active carbon with Ag coating |
| Voltage (volts): | | | | | | |
| .8 | | 1.6 | 2.4 | 1.2 | 5.2 | 7.2 |
| .75 | .9 | 5.3 | 6.8 | 3.0 | 9.8 | 17.3 |
| .70 | 2.1 | 11.2 | 12.9 | 6.3 | 18.9 | 32.2 |
| .65 | 4.3 | 18.9 | 20.8 | 10.4 | 29.3 | 52.0 |
| .60 | 6.0 | 28.4 | 28.2 | 15.7 | 39.6 | 69.6 |
| .55 | 7.3 | 32.7 | 34.4 | 21.5 | 47.9 | 84.2 |
| .50 | 8.1 | 36.5 | 39.0 | 26.0 | 55.0 | 95.0 |
| .45 | 9.0 | 39.6 | 42.1 | 28.8 | 61.7 | 107.1 |

The next table illustrates the polarization in millivolts for a current increment of 1 milliampere per cm.$^2$:

Types of positive electrode associated with negative electrode of Raney Ni:    Polarization in mv. per milliampere/cm.$^2$ Sintered Ni ---- 13.5
Sintered Ni+30% Ag ---- 3.5
Sintered Ni, silver-coated ---- 3.0
Sintered silver ---- 7.0
Active carbon ---- 3.0
Active carbon+30% Ag ---- 1.9
Active carbon, silver-coated ---- 1.2

Indisputably, the active carbon electrodes are definitely superior to those prepared from sintered nickel. It may be noted that all the electrodes may be rendered water-repellent by applying thereon a porous film of synthetic material such as polystyrene. If desired, the electrodes may be made of carbon in accordance with the method set forth in U.S. patent application filed on May 15, 1961, Ser. No. 109,925, now U.S. Pat. No. 3,202,545 for "Method of Manufacturing Electrodes for Accumulators, Fuel Cells, etc., and Electrodes Thus Obtained."

Unquestionably, the incorporation of silver acts not only as a possible oxygen activator but also as a catalyst in the depolarization reactions.

The above remarks are summarized by the curves plotted in the diagram of FIG. 9 showing the voltage values (in volts) as a function of the current density (in milliamperes per cm.$^2$).

As a negative electrode, the electrode having hitherto given the best results was used, that is, the Raney nickel electrode.

Nowadays, the best results seem to be obtained by using as a negative electrode a Raney nickel electrode and as a positive electrode an active carbon electrode coated with a silver film. A cell thus constructed will provide a power value of 0.1 watt per cm.$^2$ of electrode area with a 0.5-volt voltage.

A cell of this character has been operated during 48 hours with an output of 100 milliampere per cm.$^2$ and a voltage decrease of the order of two to three millivolts per hour has been observed. It was also observed that the voltage drop was caused only by the Raney nickel negative electrode, as the positive electrode potential remained perfectly stable throughout the operation of the cell.

This voltage drop in the negative electrode may be explained by attributing it either to the "poisoning" of the Raney nickel, or to the smothering action caused by the nitrogen contained in the commercial hydrogen utilized, without precluding the possibility that the electrolyte penetrates through the pores of the electrode (since the latter was not water-repellent) so as to retard the diffusion of the hydrogen.

This situation may be improved from the dual standpoint of polarization as a function of the current output and of the cell stability in the time. Thus, for example, Raney nickel may be dispersed in a mass of sintered nickel, for example by sintering a mixture consisting of a Raney alloy with nickel powder and then attacking the electrode by means of potash, for example. The electrode may then be rendered water-repellent by immersing same in a dilute solution of plastic material and subsequently drying same in a non-oxidizing atmosphere.

A few examples of the practical manufacture of oxygen electrodes are described hereinafter.

EXAMPLE I

An electrode is prepared from sintered nickel or active carbon coated with a silver film by placing on the bottom of a container a plate of sintered nickel or active carbon and covering same with a layer of silver nitrate solution or any equivalent salt, for example in the proportion of 200 grams per liter, while adding an aqueous solution of hydrazine, for example a 50% solution, the electrode being washed after allowing same to rest a few minutes, the cycle being repeated one or several times.

EXAMPLE II

Silver-containing carbon electrodes are prepared by mixing the carbon paste (preferably an active carbon paste) directly with the silver powder obtained by precipitating a silver oxide (for example from a nitrate) and reducing same by means of hydrazine or an equivalent substance.

The tests summarized hereinabove were performed at room temperature and under atmospheric pressure. The current density may be improved by increasing the temperature for example to 60° C. and the operating pressure for example to two atmospheres. In this case, a cell constructed according to the requirements stated hereinabove will provide an output of 600 to 650 milliamperes per cm.$^2$ at 0.6 volt.

Figure 10:
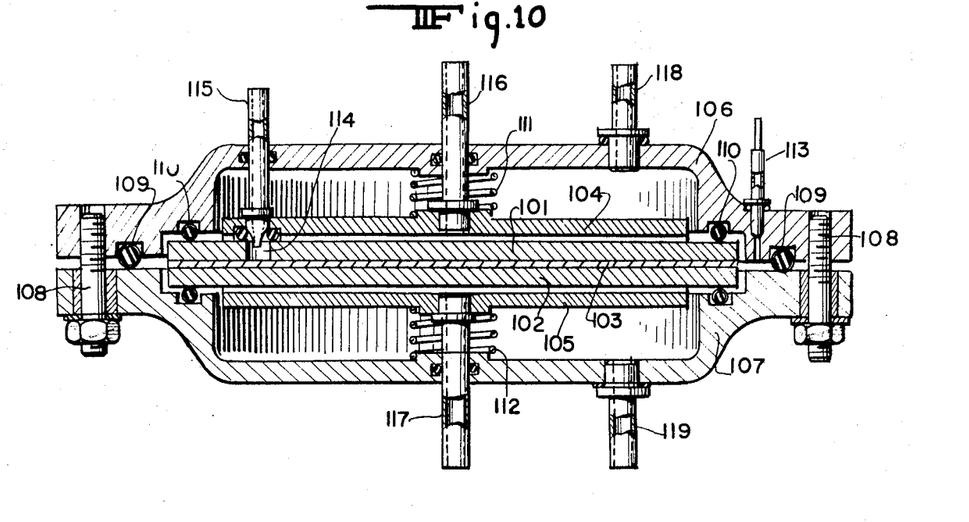
FIG. 10 is a longitudinal section taken along a cell constructed according to the teachings of this invention.
Figure 11:
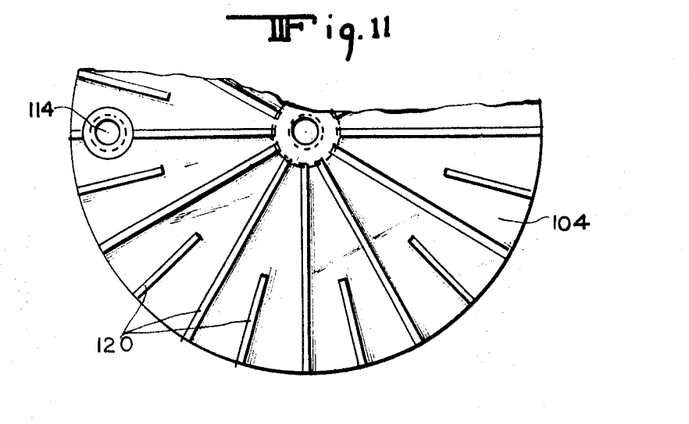
FIG. 11 is a plan view of a diffuser.
Figure 12:
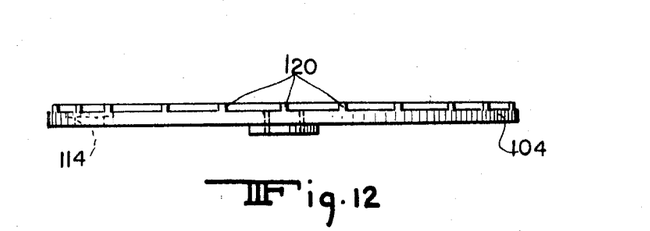
FIG. 12 is a side elevational view of the same diffuser.

In FIG. 10 there is illustrated by way of example a practical form of embodiment of a cell constructed according to this invention. In this figure there is sandwiched between the two electrodes 101 and 102 a separator 103 preferably in the form of an intermediate sheet of insulating plastic material adapted to withstand the corrosive action of the electrolyte, for example a sheet made from the material marked under the trade name of "Rilsan" and having a thickness for instance of 0.25 mm. Adjacent to the rear sides of the electrodes, that is, the sides thereof to which the gases are supplied, plates or diffusers 104 and 105 are applied. In certain zones these plates are kept somewhat spaced from the registering electrode faces to the extent just sufficient to promote the diffusion of the gases; to this end, adequate ribs or projections for example in the form of radial ribs, may be provided in the plates. A typical embodiment of these plates is illustrated in FIGS. 11 and 12. In this example, the plates are formed with radial, alternatively continuous and broken ribs 120 ensuring on the one hand the contact with the electrodes and on the other hand the passages of the gases. These two electrodes with their separators are maintained in position in a split case consisting of two halves or shells 106, 107 assembled for example by means of bolts 108, toroidal sealing gaskets 109 and 110 being interposed therebetween. These case members are preferably metallic and provided with an internal insulating lining for example of "Rilsan," nylon, polyethylene, polyvinyl chloride, etc.

Springs or like resilient members 111 and 112 are disposed between the diffusers 104, 105 and the two case halves 106, 107 to keep the electrodes resiliently pressed against the intermediate separator.

The electrolyte is supplied through a pipe 113 near the outer periphery of the case end of the electrodes, so that the electrolyte may travel along the joint plane between the electrodes. This electrolyte is evacuated in a direction at right angles to this plane through an orifice 114 formed in one of the electrodes and through another pipe 115 connected to said orifice.

The gases are fed by means of a pair of central pipes 116, 117 directly on the electrode surfaces, through the pair of diffusers 104, 105. On the other hand, the gases are discharged through pipes 118, 119 merely opening in the walls of the chamber 106, 107.

It will be seen that the current terminals of the cell may consist of the gas supply pipes 116, 117 proper, so that any other devices may be dispensed with, provided that these pipe elements are made from conducting material, and that they contact in any adequate manner the corresponding faces of the two electrodes 101, 102.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process of operating a fuel cell which process comprises supplying, to a fuel cell comprising at least one positive porous gas-diffusion electrode and at least one negative porous gas-diffusion electrode, each of said electrodes having a first major surface disposed in contact with an electrolyte referred to hereinafter and a second surface supplied with a gas, said first major surface of each electrode facing a first major surface of an electrode of opposite polarity with which it is electrically connected and being separated therefrom by a gap in the range of from about 0.05 to about 0.5 millimeter, a reducing gas to said negative electrodes and an oxidizing gas to said positive electrodes in direct contact with the respective second surfaces thereof, circulating an aqueous liquid electrolyte between and in contact with the facing first major surfaces of the electrodes of opposite polarity, eliminating from said circulating electrolyte the reaction products formed during operation of said cell, said gases being supplied to said cell at pressures greater than the pressure maintained on said electrolyte and at overpressures less than about 1 kilogram per square centimeter but insufficient to cause said gases to pass through said electrodes into said electrolyte, said cell being operated at temperatures in the range of from ambient up to about 70° C., and with substantially reduced polarization and at a higher power output, relative to a cell otherwise identically constructed and operated except that the spacing between said major surfaces of opposed electrodes is one millimeter or more, than predicted by Ohm's law from the reduction of ohmic resistance as a result of the reduced electrode spacing distance, when using a circulating liquid aqueous alkaline electrolyte at ambient temperature and at gas overpressures less than about 1 kilogram per square centimeter.

2. A process of operating a fuel cell which process comprises supplying, to a fuel cell comprising at least one positive porous gas-diffusion electrode and at least one negative porous gas-diffusion electrode, each of said electrodes having a first major surface disposed in contact with an electrolyte referred to hereinafter and a second surface supplied with a gas, said first major surface of each electrode facing a first major surface of an electrode of opposite polarity and being separated therefrom by a gap in the range of from about 0.05 to about 0.5 millimeter, a reducing gas to said negative electrodes and an oxidizing gas to said positive electrodes in direct contact with the respective second surfaces thereof, circulating an aqueous liquid electrolyte between and in contact with the facing first major surfaces of the electrodes of opposite polarity, eliminating from said circulating electrolyte the reaction products formed during operation of said cell, said cell being operated at temperatures in the range of from ambient up to about 70° C. and said gases being supplied thereto at pressures greater than the pressure maintained on said electrolyte and at overpressures less than about 1 kilogram per square centimeter but insufficient to cause said gases to pass through said electrodes into said electrolyte, said cell being operated at a Stani Factor as herein defined, of greater than one.

3. The process of claim 2 wherein said electrolyte is an aqueous potassium hydroxide solution having a concentration sufficient to provide substantially the minimum resistivity.

4. A process of operating a fuel cell, which process comprises supplying, to a fuel cell comprising positive and negative porous gas diffusion electrodes, said electrodes having a first major surface in contact with an electrolyte referred to hereinafter and a second rear surface supplied with a gas, said first major surface of each electrode facing towards a first major surface of an electrode of opposite polarity and being separated therefrom by a distance less than the maximum thickness of the ionic diffusion layers in the electrolyte, a reducing gas to said negative electrodes and an oxidizing gas to said positive electrodes in direct contact with the respective second surfaces thereof, circulating an aqueous liquid electrolyte between and in contact with the first major surfaces of the electrodes of opposite polarity, eliminating from said circulating electrolyte the reaction products formed during operation of said cell, said cell being operated at temperatures in the range of from ambient up to about 70° C. and said gases being supplied thereto at overpressures less than about 1 kilogram per square centimeter but insufficient to cause said gases to pass entirely through said electrodes into said electrolyte.

5. A method of operating a fuel cell including positive and negative gas-diffusion electrodes separated by a spacing gap having a width not less than 0.05 mm. and not greater than 0.5 mm., through which aqueous electrolyte may be circulated comprising the steps of supplying and passing said aqueous electrolyte through said spacing gap, supplying reducing gas to the negative electrodes, and oxygen gas to the positive electrodes, said electrolyte and said gases being at temperatures in the range of from about ambient to about 70° C., the overpressures of said gases having a maximum limiting value of 1 kg./cm.$^2$ and being insufficient to cause bubbling of gas through the electrodes, and ridding said cell of spent electrolyte and spent gases.

6. A method of operating a fuel cell comprising positive and negative gas-diffusion electrodes electrically connected to operate in pairs and separated by a spacing gap having a width not less than 0.05 mm. and not greater than 0.5 mm., through which liquid aqueous electrolyte may be circulated, which method comprises the steps of supplying and passing a liquid aqueous electrolyte through said spacing gap, supplying a reducing gas and an oxygen-containing gas to the negative and positive electrodes, respectively, at the surfaces thereof facing outwardly away from the surfaces confronting said spacing gap, said electrolyte and said gases being at temperatures in the range of from about ambient to about 70° C., the overpressures of said gases having a maximum limiting value of 1 kg./cm.$^2$ and being insufficient to cause bubbling of gas through the electrodes into the electrolyte, and ridding said cell of spent electrolyte and spent gases, said cell being operated at a Stani Factor, as herein defined, of greater than one.

7. A fuel cell comprising a casing, at least one positive electrode and at least one negative electrode, said electrodes being of the gas-diffusion type and each having a first electrochemically reactive major surface, each of said first major surfaces facing a first surface of an electrode which, when said cell is operating, is of opposite polarity and being disposed therefrom at a distance in the range of about 0.05 to about 0.5 millimeter, separator means constructed and disposed to maintain said electrodes at said distance and to permit circulation of the hereinafter referred to electrolyte, means constructed and arranged to permit the supplying of a reducing gas to the positive electrodes and an oxidizing gas to the negative electrodes by direct contact at locations behind the first major surfaces thereof, means constructed and arranged to permit the supplying of a single liquid aqueous electrolyte to said cell and the circulating of said electrolyte past and in contact with the first major surfaces of said electrodes, said fuel cell being capable of operation with substantially reduced polarization and at a higher power output, relative to a cell otherwise identically constructed and operated except that the spacing between said major surfaces of opposed electrodes is one millimeter or more, than predicted by Ohm's law from the reduction of ohmic resistance as a result of the reduced electrode spacing distance, when using a circulating liquid aqueous alkaline electrolyte at ambient temperature and at gas overpressures less than about 1 kilogram per square centimeter.

8. A fuel cell comprising a casing and at least one positive porous gas-diffusion electrode and at least one negative porous gas-diffusion electrode, each of said electrodes having a first major surface, each of said positive and negative electrodes being electrically connected to operate in pairs and having the first major surface of a positive electrode facing at a spaced distance from the first major surface of a negative electrode, said distance being in the range of from about 0.05 to about 0.5 millimeter, said cell being so constructed and arranged to have a reducing gas and an oxidizing gas separately introduced into direct contact with the negative and positive electrodes, respectively, at the surfaces thereof opposite said major surfaces, and further, being so constructed and arranged to have a liquid aqueous electrolyte introduced thereinto and circulated through the space between, and in contact with, said first major surfaces of said electrodes.

9. A fuel cell comprising a casing, at least one positive electrode and at least one negative electrode, said electrodes being of the gas-diffusion type and having a first major surface, each of said first major surfaces facing a first major surface of an electrode which is of opposite polarity when said cell is operating and being disposed therefrom at a distance in the range of about 0.05 to about 0.5 millimeter, said positive and negative electrodes being electrically connected to operate in pairs, said cell being so constructed and arranged to have a reducing gas and an oxidizing gas separately introduced into direct contact with the negative and positive electrodes, respectively, at the surfaces thereof opposite said major surfaces, and further being so constructed and arranged to have an aqueous electrolyte introduced thereinto and circulated through the space between and in contact with said first major surfaces of said electrodes during the operation of said cell, said fuel cell being capable of sustained operation with substantially reduced polarization using a circulating liquid aqueous electrolyte when operated at temperatures in the range of from about ambient to about 70° C. and at gas overpressures less than about 1 kilogram per square centimeter and insufficient to cause said gases to pass entirely through said electrodes into said electrolyte and said cell being characterized by having a Stani Factor of more than one.

10. A fuel cell comprising a casing, at least one positive electrode and at least one negative electrode, said electrodes being of the gas-diffusion type and each having a first major surface, each of said first major surfaces facing a first surface of an electrode of opposite polarity and being disposed therefrom at a distance less than the maximum thickness of the ionic diffusion layers in the hereinafter referred to liquid aqueous electrolyte, said positive and negative electrodes being electrically connected to operate in pairs, means constructed and arranged to permit the supplying of a liquid aqueous electrolyte to said cell and the circulating of said electrolyte between and in contact with the first surfaces of said electrodes, means constructed and arranged to permit the supplying of a reducing gas to the positive electrodes and an oxidizing gas to the negative electrodes at locations behind the first major surfaces thereof and to permit said gases to pass into said electrodes with which they are respectively in contact and towards said first major surfaces thereof, said fuel cell being capable of operation with substantially reduced polarization using a circulating liquid aqueous electrolyte at temperatures in the range of from about ambient to about 70° C. and at gas overpressures less than about 1 kilogram per square centimeter and insufficiently greater than the pressure on said electrolyte to cause said gases to pass entirely through said electrodes into said electrolyte, said fuel cell having a Stani Factor of greater than one.

11. An electric generating cell of the fuel cell type capable of being operated at from substantially ambient temperature to 70° C. by the effect of ionization of gases when supplied to the cell at from ambient temperatures to 70° C. and at overpressure below 1 kg./cm.$^2$ comprising a casing, at least a pair of gas-diffusion electrodes each having a major surface adapted for contact with the electrolyte referred to hereinafter and confronting the major surface of an electrode of opposite polarity, an aqueous liquid electrolyte, means providing space between the electrodes not less than 0.05 mm. and not greater than 0.5 mm., means for passing said aqueous electrolyte through said spacing between the confronting major surfaces of opposed electrodes, an inlet for supplying reducing gas to one of the electrodes, an inlet for supplying oxygen to the other electrode, said gases being supplied to their respective electrodes at locations opposite the major surfaces thereof, and means for eliminating spent gases and spent electrolyte from said cell, said cell when operated at temperatures from about ambient to about 70° C. and at gas overpressures not exceeding 1 kg./cm.$^2$ having a Stani Factor of greater than one.

12. An elecric generating fuel cell, wherein the cell electrodes are inert, porous and not attacked by the liquid electrolyte of the cell and are arranged with their electrochemically reactive major surfaces facing each other separated by a gap, said cell having means for causing the flow of a liquid aqueous electrolyte to pass through said gap and in contact with said reactive major surface when the cell is in operation, and means for feeding, when the cell is in operation, a reducing gas and an oxidizing gas respectively from the outwardly facing surfaces of the electrodes through the pores thereof to the inwardly facing reactive major surfaces in such a way that the outwardly facing surfaces are solely in contact with a gaseous phase, and wherein the width of said gap is between about 0.05 millimeter and about 0.5 millimeter inclusive, whereby the fuel cell can be operated at moderate temperature and low superatmospheric pressure.

13. An electric generating cell of the fuel cell type capable of being operated at from substantially ambient temperature to 70° C. by the effect of ionization of gases when supplied to the cell at from ambient temperature to 70° C. and at overpressure below 1 kg./cm.$^2$, said cell comprising a casing, at least a pair of gas-diffusion electrodes each having a first major surface disposed for contact with the electrolyte referred to hereinafter and confronting the first major surface of an electrode of opposite polarity, an aqueous liquid electrolyte, means providing space between the electrodes not less than 0.05 mm. and not greater than 0.5 mm., inlet and outlet means for said electrolyte, means for passing said aqueous electrolyte through said space between the confronting major surfaces of opposed electrodes and in contact with said surfaces, an inlet for supplying a reducing gas to one of the electrodes, an inlet for supplying an oxidizing gas to the other electrode, said inlets being arranged and constructed such that said gases are to be supplied in direct contact to their respective electrodes at locations opposite the first major surfaces thereof, and means for eliminating spent gases from said cell.

References Cited

UNITED STATES PATENTS

| | | | |
|---|---|---|---|
| 2,070,612 | 2/1937 | Niederreither | 136—86 |
| 2,384,463 | 9/1948 | Gunn et al. | 136—86 |
| 2,646,455 | 7/1953 | Jeannin | 136—24 |
| 2,872,498 | 2/1959 | Granger | 136—146 |
| 2,903,496 | 9/1959 | Vogt | 136—6 |
| 3,012,086 | 12/1961 | Vahldieck | 136—86 |
| 3,188,242 | 6/1965 | Kordesch et al. | 136—86 |

OTHER REFERENCES

Proceedings 13th Power Sources Conference, Power Sources Division, U.S. Army Signal and Development Laboratory, Fort Monmouth, N.J.; Low Temperature Type by G. E. Evans, pp. 108–111, April 1959.

Direct Current, September 1952, p. 34.

ALLEN B. CURTIS, Primary Examiner